(12) United States Patent
Livingstone (10) Patent No.: US 7,131,616 B2
(45) Date of Patent: Nov. 7, 2006

(54) COLLAPSIBLE HOOK WITH TWO MAGNETS

(75) Inventor: David E. Livingstone, Harrietsville (CA)

(73) Assignee: Henkel Diversified, Inc., Ontario (CA)

( * ) Notice: Subject to any disclaimer, the term of this patent is extended or adjusted under 35 U.S.C. 154(b) by 25 days.

(21) Appl. No.: 11/055,689

(22) Filed: Feb. 11, 2005

(65) Prior Publication Data

US 2006/0071137 A1 Apr. 6, 2006

Related U.S. Application Data

(63) Continuation-in-part of application No. 10/958,347, filed on Oct. 6, 2004.

(51) Int. Cl.
*F16B 45/00* (2006.01)
(52) U.S. Cl. .................................. 248/304; 248/206.5
(58) Field of Classification Search ............ 248/206.5, 248/220.1, 288.1, 291.1, 301, 303, 304, 307, 248/308, 309.4; 211/100, 171
See application file for complete search history.

(56) References Cited

U.S. PATENT DOCUMENTS

| | | | |
|---|---|---|---|
| 1,335,881 A | 4/1920 | Dottl | |
| 1,431,431 A | 10/1922 | Rutzler | |
| 1,596,451 A | 8/1926 | Rawlings | |
| 1,798,768 A | 3/1931 | Vance | |
| 1,805,984 A | 5/1931 | Hull | |
| 2,275,007 A | 3/1942 | Caestecker | |
| 2,471,349 A * | 5/1949 | Reiss | 211/99 |
| 2,901,207 A | 8/1959 | Adam | |
| 3,131,903 A | 5/1964 | Quick | |
| 3,582,032 A | 6/1971 | Placek | |
| 3,601,862 A | 8/1971 | Hargadon | |
| 3,847,336 A | 11/1974 | Morris | |
| 3,900,180 A | 8/1975 | McPhee | |
| 3,923,278 A | 12/1975 | Marcil | |
| 3,957,241 A | 5/1976 | Morris | |
| 4,088,292 A | 5/1978 | Emminger | |

(Continued)

FOREIGN PATENT DOCUMENTS

CA 2305128 4/2000

(Continued)

OTHER PUBLICATIONS

Bobrick Technical Data Sheet for B-982 Series Vandal-Resistant Clothes Hook, (Bobrick Washroom Equipment Inc., Oct. 1998).

*Primary Examiner*—Anita King
*Assistant Examiner*—Michael McDuffie
(74) *Attorney, Agent, or Firm*—Standley Law Group LLP (57) ABSTRACT

A hook for hanging articles is capable of holding the weight of a typical garment or knapsack while permitting the release of heavier objects. The hook has a base with two spaced-apart outwardly extending brackets and an arm pivotally mounted to and between the brackets. The arm is pivotable between a load bearing and load releasing position. A first magnet is secured to the arm and a second magnet is secured to the base. The first magnet is magnetically connected to the second magnet to maintain the arm in the load bearing position. The magnetic connection is releasable to permit the arm to move towards the load releasing position when a load having a weight in excess of a predetermined weight is applied to the arm. The first magnet provides weight for returning the arm to the load bearing position after the load has been released. Such hooks are particularly useful in schools to reduce the possibility of children being hung from hooks.

16 Claims, 7 Drawing Sheets

U.S. PATENT DOCUMENTS

| | | |
|---|---|---|
| 4,170,333 A | 10/1979 | Angelastro |
| 4,309,052 A | 1/1982 | Drayton |
| 4,537,434 A | 8/1985 | Piercy |
| D301,406 S | 6/1989 | Barbieri et al. |
| 4,840,341 A * | 6/1989 | Hasegawa ................ 248/316.5 |
| 4,932,626 A | 6/1990 | Guillot |
| D361,930 S | 9/1995 | Fillipp et al. |
| 5,566,843 A * | 10/1996 | Kruska ....................... 211/104 |
| 6,001,471 A | 12/1999 | Bries et al. |
| 6,152,416 A * | 11/2000 | Jacob ..................... 248/441.1 |
| 6,161,264 A | 12/2000 | Choate |
| 6,199,811 B1 | 3/2001 | Fargo |
| 6,352,229 B1 * | 3/2002 | Adams .................... 248/316.7 |
| 6,484,888 B1 * | 11/2002 | Miller .......................... 211/5 |
| 6,491,271 B1 * | 12/2002 | Adams .................... 248/206.5 |
| 2002/0179793 A1 * | 12/2002 | Wang ......................... 248/308 |

FOREIGN PATENT DOCUMENTS

| | | |
|---|---|---|
| CA | 2360701 | 10/2001 |
| CA | 2349784 | 12/2002 |
| CA | 2384716 | 6/2003 |
| GB | 153726 | 11/1920 |
| GB | 390755 | 4/1933 |
| WO | WO 03/002904 | 1/2003 |

* cited by examiner

COLLAPSIBLE HOOK WITH TWO MAGNETS

CROSS-REFERENCE APPLICATIONS

This application is a continuation-in-part of U.S. Ser. No. 10/958,347 filed Oct. 6, 2004, which is herein incorporated by reference in its entirety.

FIELD OF THE INVENTION

The present invention relates to hooks for hanging articles, for example garments. In particular, the present invention relates to collapsible safety hooks.

DESCRIPTION OF RELATED ART

Hooks are used for a variety of applications including hanging garments and other articles. Typically the hook is affixed to an upstanding structure such as a wall or a post. In some settings, for example in schools, rigid hooks for hanging garments and the like pose a safety risk to children who, through misfortune or deliberate act, find themselves suspended from the hook. In such a case, it would be beneficial if the hook would release automatically thereby permitting the child to escape from the hook in an expeditious manner.

There have been a number of proposals in the art for such "safety hooks". For example, Canadian patent application 2,305,128 filed Apr. 17, 2000 discloses a child safe coat hook that comprises a stationary wall plate secured to a wall and a hook-like member pivotally connected horizontally to the lower extremity of the wall plate. The hook is held in the upright position by a spring-like protruding portion on the wall plate engaged within a corresponding depression on the hook-like member. When sufficient manual pressure is applied to the top of the hook-like member, the hook-like member releases from the spring-like protrusion and falls to a lowered position which permits an excessive load to slide off the hook-like member. This hook disadvantageously does not automatically return to the upright position but must be reset manually.

U.S. Pat. No. 6,199,811 issued Mar. 13, 2001 discloses a deformable safety hook comprising a base portion mountable to a wall and an article supporting portion extending from the base portion. The hook is constructed from a material that has sufficient strength to support an article, but readily deforms under an excessive load without permanent damage and substantially recovers its original shape when unloaded. Hooks, such as this, made of readily deformable materials having shape memory disadvantageously lose their shape memory relatively quickly and are prone to sudden breaking due to material fatigue.

Canadian patent application 2,349,784 filed Jun. 4, 2001 discloses a safety coat hook that will not support loads in excess of 20–25 pounds. The safety coat hook comprises a top steel plate having a hook mounted thereon, a bottom steel plate affixed to a wall, a steel pin holding the steel plates together in a pivotable manner and a loaded spring on the steel pin which keeps the coat hook in an upright position. When excessive weight is applied, the steel spring does not have sufficient torque to keep the hook upright, therefore, the hook begins to collapse and the overweight item slides off the hook. Once the overweight item is off the hook, the steel spring returns the hook to the normal upright position. This hook disadvantageously has a number of sharp edges and pinch points for catching soft articles such as garments. In addition, the loaded spring disadvantageously snaps the hook back vigorously into the upright position, thereby creating a safety hazard as the rapidly moving hook may cause injury to a person.

Canadian application 2,360,701 filed Oct. 31, 2001 is directed to a safety hook that operates similarly to the one described in CA 2,349,784. The safety hook comprises a plate affixed to a wall, a steel pin pivotably mounted on the plate, a loaded spring on the steel pin and an arm member (the hook) mounted on the pivotable pin. The loaded spring keeps the arm member in an upright position. When excessive weight is applied to the arm member, the steel spring does not have sufficient torque to keep the arm upright, therefore, the arm begins to collapse and the overweight item slides off the arm. Once the overweight item is off the arm, the steel spring returns the arm to the normal upright position. This hook disadvantageously has a number of sharp edges and pinch points for catching soft articles such as garments, necessitating further engineering and parts to reduce this problem. In addition, the loaded spring disadvantageously snaps the arm back vigorously into the upright position, thereby creating a safety hazard as the rapidly moving arm may cause injury to a person. This hook disadvantageously is constructed from many different parts thereby adding significantly to the cost of production.

SUMMARY OF THE INVENTION

According to an aspect of the invention, there is provided a hook comprising: a base; an arm pivotally mounted to the base; a releasable connecting means for releasably connecting the arm to the base to maintain the arm in a load bearing position, the releasable connecting means releasable to permit the arm to move towards a load releasing position when a load having a weight in excess of a predetermined weight is applied to the arm; and effort imparting means mounted to the arm for returning the arm to the load bearing position after the load has been released.

According to another aspect of the invention, there is provided a hook comprising: a base; an arm having a first end and a second end, the arm pivotally mounted to the base at a pivot position between the first and second ends so that the arm has a load bearing section from the first end to the pivot position and an effort bearing section from the second end to the pivot position; a releasable connecting means for releasably connecting the effort bearing section to the base to maintain the arm in a load bearing position, the releasable connecting means releasable to permit the arm to move towards a load releasing position when a load having a weight in excess of a predetermined weight is applied to the load bearing section; and effort imparting means mounted to the effort bearing section for returning the arm to the load bearing position after the load has been released.

According to yet another aspect of the invention, there is provided a hook comprising: a base having a back and a front and having two spaced-apart outwardly extending brackets; an arm having a first end and a second end, the arm pivotally mounted to and between the brackets at a pivot position between the first and second ends so that the arm has a load bearing section from the first end to the pivot position and an effort bearing section from the second end to the pivot position, the arm pivotable between a load bearing position and a load releasing position; a first magnet secured to the arm proximal the second end; a second magnet secured to the base; the first magnet magnetically connected to the second magnet to maintain the arm in the load bearing position, the magnetic connection releasable to permit the arm to move towards the load releasing position when a load having a weight in excess of a predetermined weight is applied to the load bearing section of the arm; and, the first magnet providing weight on the effort bearing section of the arm for returning the arm to the load bearing position after the load has been released.

According to still yet another aspect of the invention, there is provided a hook comprising: a base having a back and a front, two spaced-apart outwardly extending brackets, and a guard housing between the spaced-apart brackets, the back of the base having an opening; an arm having a first end and a second end, the arm pivotally mounted to and between the brackets at a pivot position between the first and second ends so that the arm has a load bearing section from the first end to the pivot position and an effort bearing section from the second end to the pivot position, the arm pivotable between a load bearing position and a load releasing position; a first magnet secured in a pocket integrally formed with the arm at the second end; a second magnet secured to the base; the first magnet magnetically connected to the second magnet to maintain the arm in the load bearing position, the magnetic connection releasable to permit the arm to move towards the load releasing position when a load having a weight in excess of a predetermined weight is applied to the load bearing section of the arm; and, the first magnet providing weight on the effort bearing section of the arm for returning the arm to the load bearing position after the load has been released.

Such hooks may be used in any setting. They are particularly useful in schools and like institutions to reduce the possibility of children being suspended from hooks. They also help reduce damage to walls from overloaded backpacks.

The base is preferably adapted to be mounted to an upright structure, for example, a wall, a door or a post. Mounting the base to the upright structure may be accomplished by any suitable means, for example, by nailing, screwing, bolting, riveting, gluing, taping or some combination thereof. Screwing and bolting are preferred as these methods offer a strong but reversible connection to the upright structure. In applications where screwing or bolting is impossible or undesirable, two-sided tape and structural glue are excellent alternatives.

The arm of the hook generally provides support for hanging articles, for example, garments, bags, and the like. The arm has a first end and a second end and is pivotally mounted to the base at a pivot position between the first and second ends so that the arm may pivot between a load bearing position and a load releasing position. Any suitable pivoting means may be used. For example, the arm may be mounted to a protrusion on the base by means of one or more pins. The pins may be straight pins, screws, etc. or a combination thereof. The pin may be pivotally mounted to the arm and/or base on or in a surface thereof, or may pass through one or more holes in the arm and/or base. Preferably, the arm is pivotally mounted to the base by means of a straight pin passing through aligned holes in the arm and in one or more, preferably two, outwardly extending protrusions of the base.

In the load bearing position, the arm is angled so that an article cannot slip off the hook. In the load releasing position, the arm is angled so that a load on the hook is able to slip off the hook. When a load on the arm has a weight that exceeds a predetermined weight, the arm pivots from the load bearing position to the load releasing position thereby allowing the load to slip off the arm. The arm may be of any suitable profile, for example, straight or curved. The arm may be contoured to assist in supporting articles when the arm is in the load bearing position, and to assist in releasing a load when the arm is in the load releasing position. For example, the arm may have a generally U-shaped portion between the pivot position and the first end and the arm may be mounted to the base at a location and in such a fashion as to encourage the article to slide away from the base into the bottom of the U-shaped portion thereby encouraging consistent application of load at a localized portion of the arm. The arm and base, including any protruding portions, may be contoured in such a fashion as to reduce or eliminate pinch or catch points.

The arm preferably has a load bearing section from the first end to the pivot position, and an effort bearing section from the second end to the pivot position. The load bearing section supports articles hanging from the hook. Mounted to the effort bearing section is an effort imparting means for returning the arm to the load bearing position from the load releasing position after the load has been released. The effort imparting means is preferably a weight attached above or below the effort bearing section and preferably adjacent the second end to maximize mechanical advantage. More preferably, the weight is attached below the effort bearing section. Preferably, the weight is pivotally attached to the effort bearing section, for example, by means of a thin wire or string from which the weight hangs or by means of one or more pins. The weight should be at least heavy enough to be able to return the unloaded arm from the load releasing position to the load bearing position.

A releasable connecting means releasably connects the arm to the base to prevent the arm from pivoting on the base in order to maintain the arm in a load bearing position. When a load having a weight in excess of a predetermined weight is applied to the arm (i.e. the load bearing section), the releasable connecting means releases the arm from the base permitting the arm to pivot on the base to thereby move the arm towards the load releasing position. The predetermined weight is particular to the specific application for which the hook is used. In connection with hooks in schools, a predetermined weight of from about 5–25 pounds, preferably 5–15 pounds, more preferably 5–10 pounds, even more preferably about 10 pounds, is generally suitable since most garments do not exceed about 5 pounds in weight and most school-age children exceed about 25 pounds in weight. If the hook is also intended to hold the weight of a knapsack, then the predetermined weight is desirably below but close to 25 pounds.

Any suitable releasable connecting means may be used, for example, magnetic means, latches, hook & loop fabric, etc. Magnetic means are preferred as they involve fewer parts, they are less prone to performance failure and they offer a sharp transition between connecting and releasing. Any of a number of arrangements of the magnetic means may be employed. For example: a magnet may be mounted on the effort bearing section of the arm and a ferromagnetic element (e.g. a steel plate) mounted on the base to which the magnet connects by means of its magnetic field; a magnet may be mounted on the base and a ferromagnetic element mounted on the effort bearing section to which the magnet connects by means of its magnetic field; a first magnet may be mounted on the base and a second magnet mounted on the effort bearing section to which the first magnet is connected by means of the magnetic fields of the two magnets. Since magnets have weight, it is possible for the same magnet to be simultaneously part of both the releasable connecting means and the effort imparting means. Other possible arrangements will be immediately apparent to one skilled in the art.

When the releasable connecting means comprises a magnet, and when the hook is to be mounted on to a ferromagnetic structure (e.g. steel doors, walls having metal studs, etc.), sometimes it may be necessary to take measures to reduce the effect that the ferromagnetic structure has on the operation of the hook. For example, magnetic shielding may be used, the distance between the magnet and the ferromagnetic structure may be increased, and/or the magnet may be mounted on the base with a ferromagnetic element mounted on the effort bearing section of the arm. Magnetic shielding may be placed between the magnet and ferromagnetic structure and may be separate from or incorporated into the base. Increasing the distance may be accomplished by, for example, making the base of the hook thicker. Mounting the magnet on the base while having a ferromagnetic element on the effort bearing section of the arm means that the magnet would not be on a movable part of the hook, therefore, movement of the arm would be less affected by the ferromagnetic structure. Additionally, selecting a magnet having a field strength that declines more dramatically with distance may be done. A combination of the above measures may be used. Such measures may not be needed if the ferromagnetic structure does not unduly affect the hook's operation.

The strength of the magnet (or combined strengths of the magnets) should provide a connection that releases when a weight in excess of the predetermined weight is applied to the load bearing section of the arm. Preferably, magnetic field strength falls off sharply with distance to provide a sharp transition between connecting and releasing. While the type of magnet is not particularly restricted, rare earth super magnets, particularly neodymium super magnets (available, for example, from Gaussboys™), are preferred. Such super magnets have high strength and keep their strength well over time. The shape of the magnet is not particularly restricted. Blocks and disks are preferred.

The various parts of the hook may be constructed from any suitably strong materials, for example plastics, metals, composites, combinations thereof, etc. When the releasable connecting means comprises a magnet, the various parts of the hook are constructed from non-ferromagnetic materials, for example plastics, non-magnetic metals (e.g. aluminum), composites and combinations thereof. Preferably, the base and arm are made of a rigid plastic, for example polycarbonate, polycarbonate hybrid, acrylic, ABS, etc. Polycarbonate hybrid (e.g. Xenoy™ from GE Plastics) is of particular note. The arm is preferably molded as one piece for structural strength. The base may be molded as one piece or assembled from several pieces. The various parts of the hook may also be constructed with contoured edges to reduce the possibility of damage to articles and of personal injury, and to reduce the possibility of snagging articles on the hook.

In another aspect of the invention, a hook rack comprises a plurality of hooks of the present invention mounted on a single support means and the support means mounted on an upright structure, for example, a wall or a post. Such an arrangement facilitates installation of many hooks quickly and efficiently. Such an arrangement also provides the opportunity to conceal the base of each hook within the support means to reduce the possibility of theft.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

DETAILED DESCRIPTION OF PREFERRED EMBODIMENTS

Referring to FIGS. 1–7, a hook in accordance with one embodiment of the present invention comprises a base 10 having two outwardly extending spaced-apart brackets 11,12. The base is mountable to an upright surface such as a wall by means of screws through screw holes 91,92 in the base. Safety screws may be used and the screw holes may be countersunk so that the heads of the screws do not protrude above the surface of the base. When the base is mounted on an upright surface, the brackets 11,12 protrude horizontally. All edges of the base and brackets are contoured for smoothness.

Figure 7A:
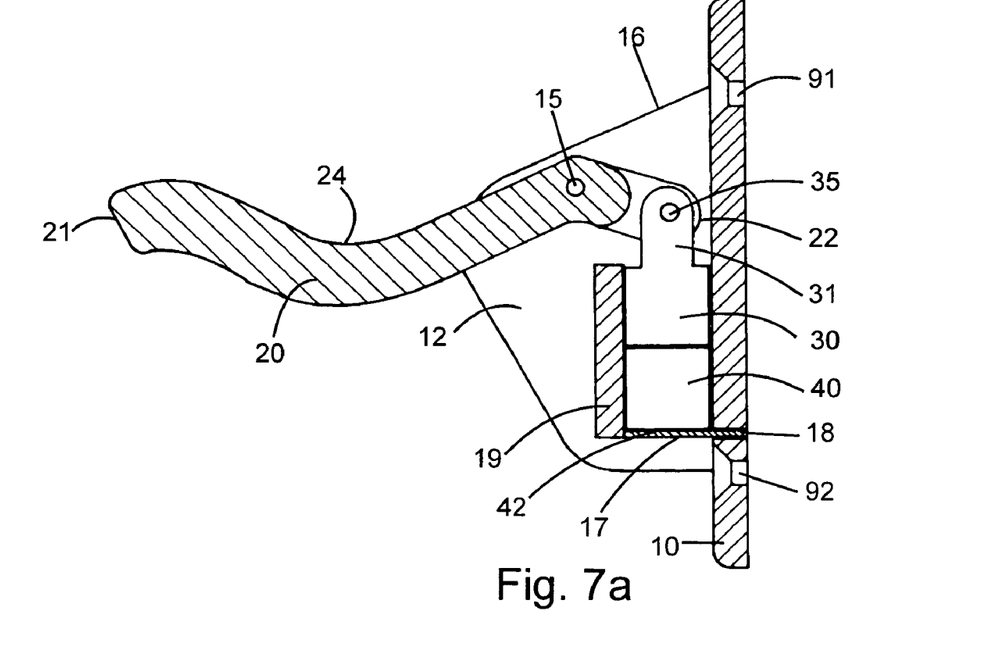
FIG. 7a is a side sectional view of the hook of FIG. 1 in a load bearing position.
Figure 7B:
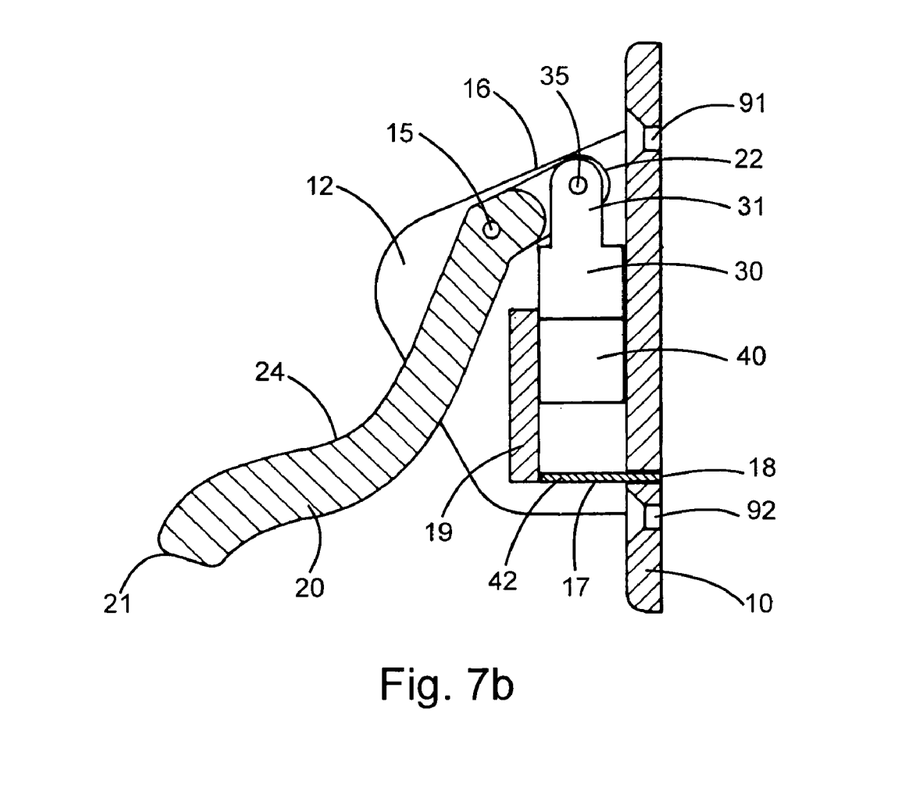
FIG. 7b is a side sectional view of the hook of FIG. 1 in a load releasing position.

An arm 20, having a first end 21 and a second end 22, is disposed between and pivotally mounted to the brackets 11,12 by means of a first pin 15 inserted through aligned apertures 13,14 in the brackets and through a first hole in the arm. The first pin 15 is thus located at a pivot position between the first and second ends of the arm. As is most clearly seen in FIGS. 7a and 7b, the arm can pivot about the first pin 15 between a load bearing position (FIG. 7a) and a load releasing position (FIG. 7b). The section of the arm between the first end 21 and the first pin 15 is a load bearing section and generally bears a load placed on the hook. The section of the arm between the second end 22 and the first pin 15 is an effort bearing section, which is described in more detail below.

The arm 20 is generally U-shaped in the load bearing section forming a groove or valley 24. As is best seen in FIG. 7a, the arm between the valley 24 and the first pin 15 is substantially aligned with upper edges 16 of the brackets 11,12 when the arm is in the load bearing position. Thus, when an article is placed on the hook it will slide down into the valley providing a load on the load bearing section substantially at the valley. Still referring to FIG. 7a, when the arm is in the load bearing position, the arm between the valley 24 and the first end 21 generally extends upwardly and outwardly so that a load cannot slip out of the valley and off the hook. However, the length of the arm just before the first end 21 is smooth and rounded to assist in permitting a load to slip off the arm when the arm is in the load releasing position as shown in FIG. 7*b*. In the load releasing position, the arm 20 generally extends downwardly and outwardly.

The section of the arm 20 from the first pin 15 to the second end 22 is the effort bearing section. As is evident from FIGS. 7*a* and 7*b*, the effort bearing section angles downwardly from the first pin to the second end when the arm is in the load bearing position (FIG. 7*a*) and angles upwardly from the first pin to the second end when the arm is in the load releasing position (FIG. 7*b*). Pivotally mounted to the effort bearing section of the arm adjacent the second end is a substantially block-like weight 30 having a mounting tab 31. The weight 30 is pivotally mounted to the arm by means of a second pin 35 inserted through two aligned holes in the arm and through an aperture in the mounting tab 31. The weight is able to pivot freely about the second pin. As can be best seen in FIG. 5, the second end of the arm is split into two spaced-apart fingers 27,28 having holes between which the mounting tab 31 is disposed.

Attached to the underside of the weight 30 is a block-like neodymium super magnet 40 having a strength of 12 pounds. The magnet is attached to the weight by means of structural epoxy. Both the weight and the magnet are disposed between the brackets 11,12 and under the second end 22 of the arm 20. Referring to FIG. 7*a*, when the arm is in the load bearing position, the magnet 40 rests on and is magnetically connected to a steel plate 42 protruding perpendicularly from the base 10. When a load having a weight in excess of about 10 pounds is placed on the load bearing section of the arm 20, the magnet 40 releases from the steel plate 42 and the arm moves to the load releasing position as depicted in FIG. 7*b*. When the arm is in the load releasing position, the magnet is suspended somewhat above the steel plate.

When the arm 20 is in the load releasing position, the load slides off the arm. Once the load has been removed from the arm, the combined weight of the weight 30 and the magnet 40 under the influence of gravity (i.e. the effort) pulling down on the effort bearing section of the arm causes the arm to pivot about the first pin 15 thereby returning the arm to the load bearing position. Once the arm is back in the load bearing position, the magnet 40 once again rests on the steel plate 42 and magnetically re-connects to the steel plate thereby maintaining the arm in the load bearing position.

Unlike in prior art spring-loaded hooks, in a hook of the present invention the force holding the arm to the base to maintain the arm in the load bearing position (e.g. the magnetic force) may be much greater than the force exerted on the arm to return the arm to the load bearing position from the load releasing position (e.g. the combined weight of the weight and magnet). In prior art spring-loaded hooks, the two forces are the same, therefore, the prior art hooks are prone to snapping back violently once the load is released, raising the possibility of injuring a person. In contrast, in a hook of the present invention, the return force may be much less than the maintaining force thereby reducing the possibility of injuring a person when the arm returns to the load bearing position.

The steel plate 42 is supported on the base 10 in a sleeve 17 protruding outwardly from near the bottom of the base. The steel plate is inserted into, and may be removed from, the sleeve through a slot 18 in the back of the base. The sleeve is a molded part of the base and accepts the steel plate as the plate slides through the slot. The sleeve is closed at the front to prevent removal of the steel plate from the front. The sleeve may be open on the top except for a lip so that the magnet 40 can directly contact the steel plate 42 in the load bearing position. The lip would prevent the magnet from lifting the steel plate out of the sleeve when the arm moves to the load releasing position. Since the base is generally attached to an upright surface, it is generally necessary to detach the hook from the upright surface in order to insert and remove the steel plate. The sleeve is open on a portion of the top so that the magnet 40 can rest directly on the steel plate 42.

A guard wall 19 is mounted between the brackets 11,12 so that the weight 30 and the magnet 40 are disposed between the guard wall 19 and the base 10. The guard wall helps prevent access to the magnet and the weight thereby reducing the possibility of tampering. The guard wall also increases the aesthetic appeal of the hook. The guard wall also helps prevent the magnet and weight from swinging as the arm moves between the load and effort bearing positions (or vice versa) so that the magnet 40 remains aligned with the steel plate 42. The guard wall 19 may be mounted to one or both of the brackets 11,12, mounted to the sleeve 17, or mounted to one or both of the brackets and the sleeve. Preferably, the guard wall 19 is mounted to both of the brackets 11,12 and to the sleeve 17 for better structural rigidity and for better protection against tampering.

Figure 1:
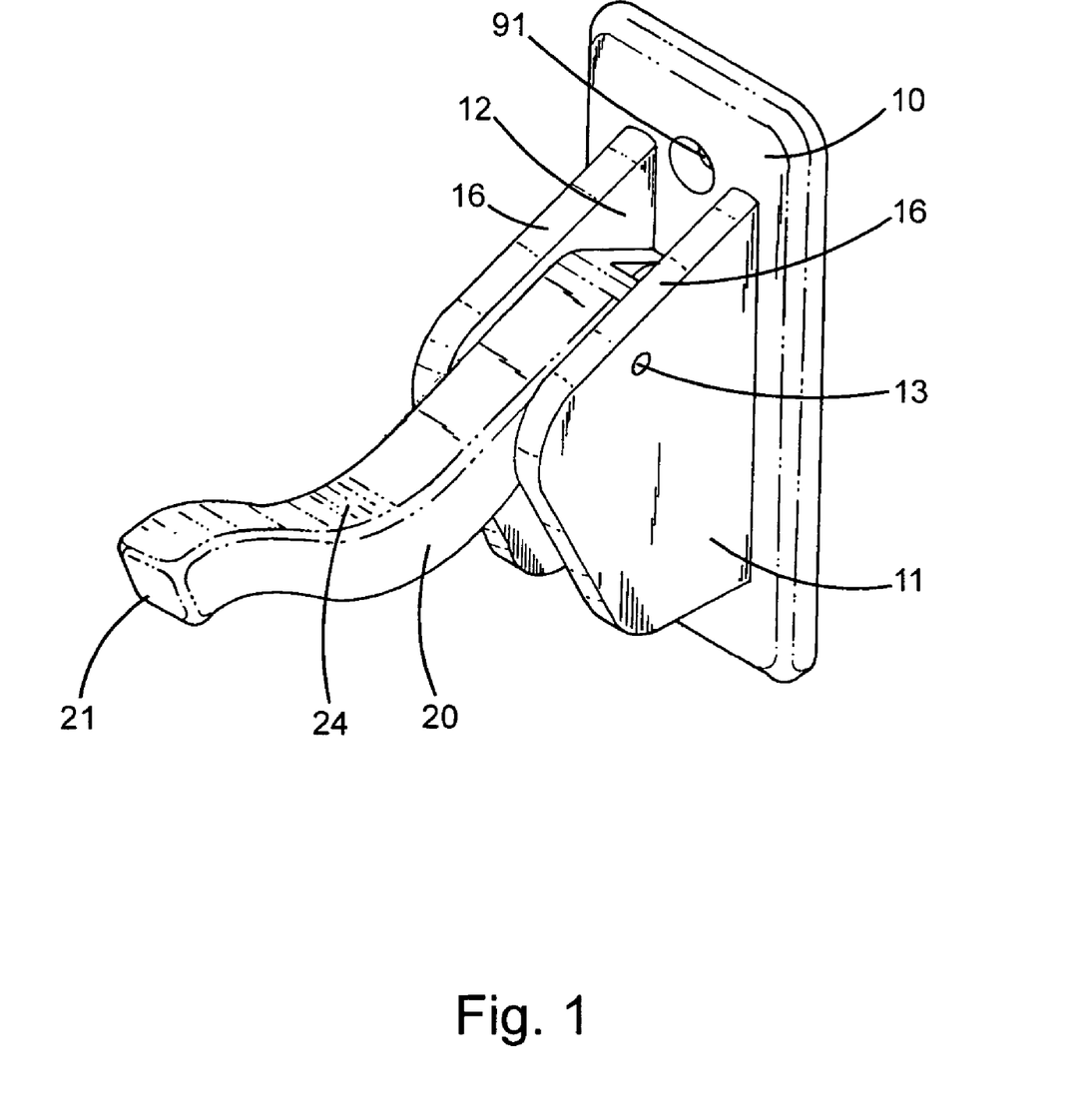
FIG. 1 is a perspective view of one embodiment of a hook of the present invention.
Figure 2:
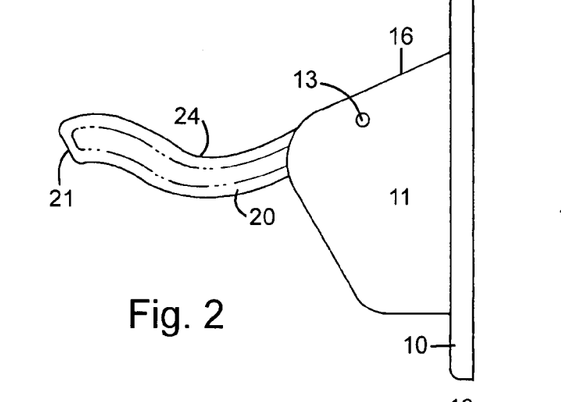
FIG. 2 is a side view of the hook of FIG. 1.
Figure 3:
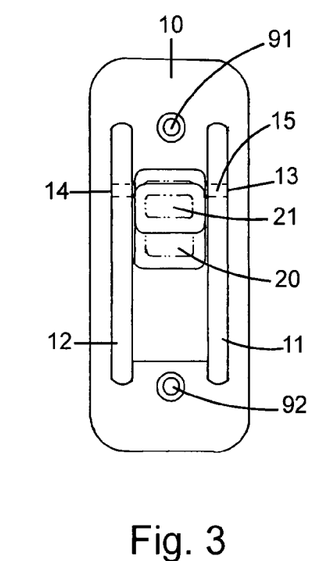
FIG. 3 is a front view of the hook of FIG. 1.
Figure 4:
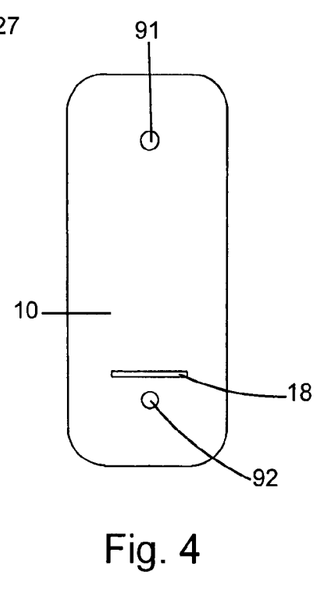
FIG. 4 is a back view of the hook of FIG. 1.
Figure 5:
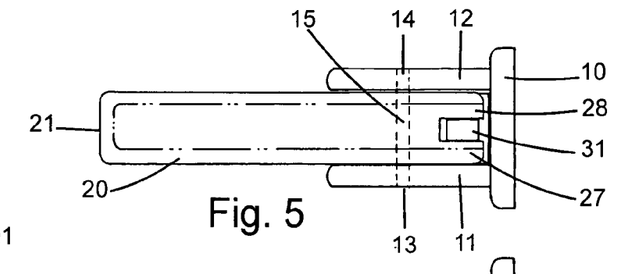
FIG. 5 is a top view of the hook of FIG. 1.
Figure 6:
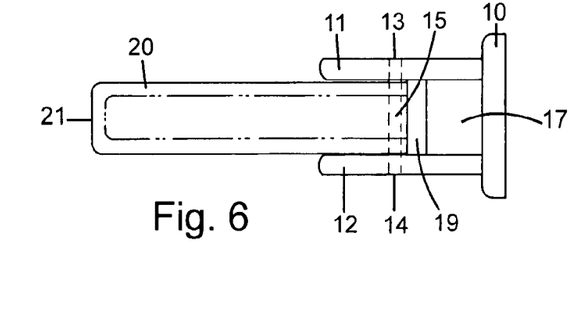
FIG. 6 is a bottom view of the hook of FIG. 1.
Figure 8A:
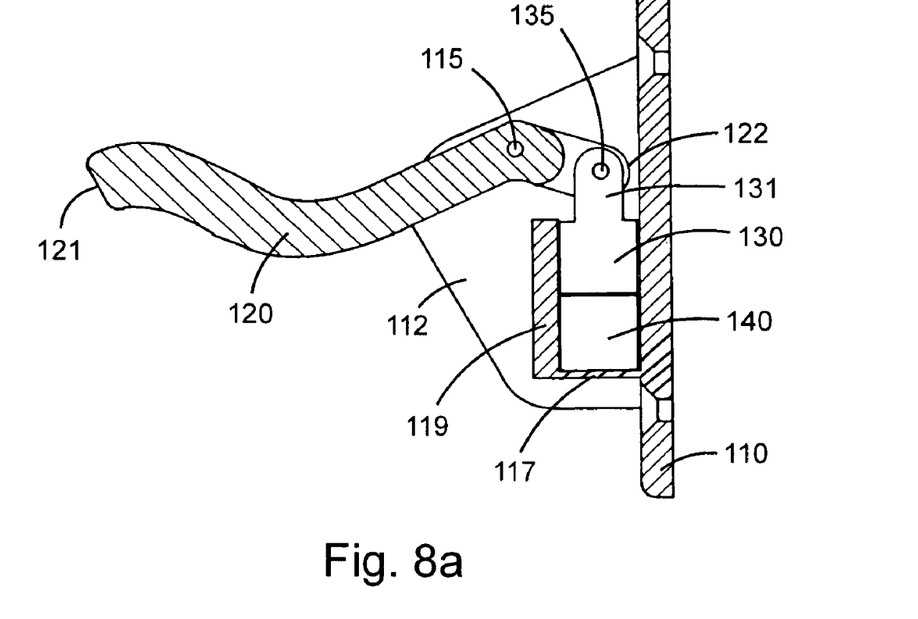
FIGS. 8a and 8b are side sectional views of a second embodiment of a hook of the present invention in a load bearing position and a load releasing position, respectively.
Figure 8B:
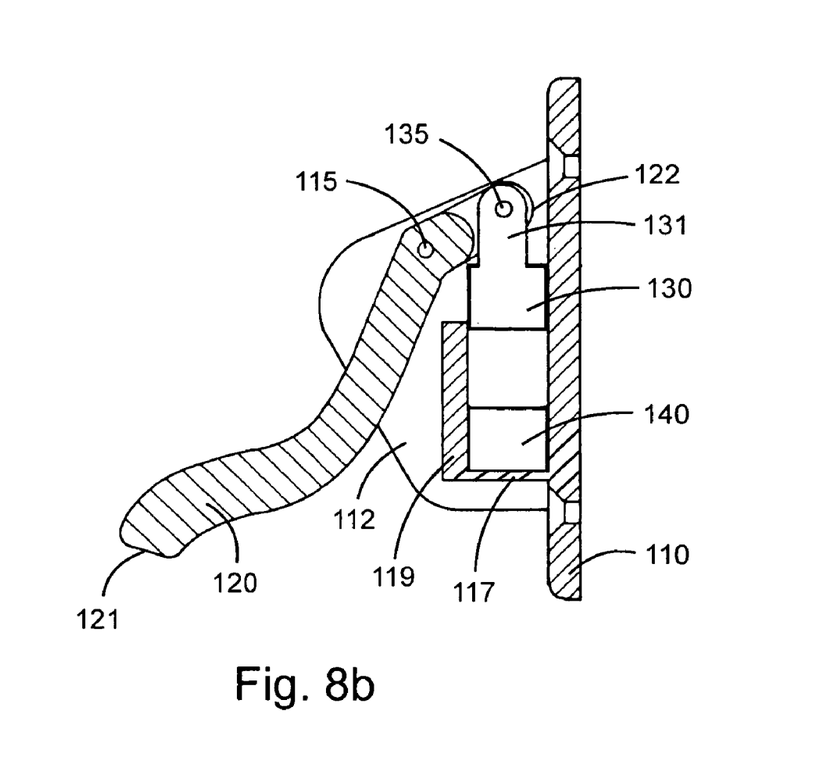

Referring to FIGS. 8*a* and 8*b*, a hook in accordance with a second embodiment of the present invention is similar to the hook of FIG. 1 and comprises a base 110 having two outwardly extending spaced-apart brackets (only one shown 112). An arm 120, having a first end 121 and a second end 122, is disposed between and pivotally mounted to the brackets by means of a first pin 115 inserted through aligned apertures in the brackets and through a first hole in the arm. The arm can pivot about the first pin 115 between a load bearing position (FIG. 8*a*) and a load releasing position (FIG. 8*b*). The section of the arm between the first end 121 and the first pin 115 is a load bearing section and generally bears a load placed on the hook. The section of the arm between the second end 122 and the first pin 115 is an effort bearing section.

Pivotally mounted to the effort bearing section of the arm adjacent the second end is a substantially block-like ferromagnetic weight 130 having a mounting tab 131. The weight 130 is pivotally mounted to the arm by means of a second pin 135 inserted through two aligned holes in the arm and through an aperture in the mounting tab 131. The weight is able to pivot freely about the second pin.

Attached to a support platform 117 protruding horizontally from the base 110 is a block-like neodymium super magnet 140 having a strength of 10 pounds. The magnet is attached to the platform by means of structural epoxy. Both the weight and the magnet are disposed between the brackets and under the second end of the arm. Referring to FIG. 8*a*, when the arm is in the load bearing position, the weight 130 is magnetically connected to the magnet 140. When a load having a weight in excess of about 10 pounds is placed on the load bearing section of the arm 120, the weight 130 releases from the magnet 140 and the arm moves to the load releasing position as depicted in FIG. 8*b*. When the arm is in the load releasing position, the weight is suspended somewhat above the magnet.

When the arm 120 is in the load releasing position, the load slides off the arm. Once the load has been removed from the arm, the weight of the weight 130 under the influence of gravity (i.e. the effort) pulling down on the effort bearing section of the arm causes the arm to pivot about the first pin 115 thereby returning the arm to the load bearing position. Once the arm is back in the load bearing position, the weight 130 once again is magnetically connected to the magnet 140 thereby maintaining the arm in the load bearing position. A guard wall 119 is mounted between the brackets and attached to the platform 117 so that the weight 130 and the magnet 140 are disposed between the guard wall 119 and the base 110.

Figure 9:
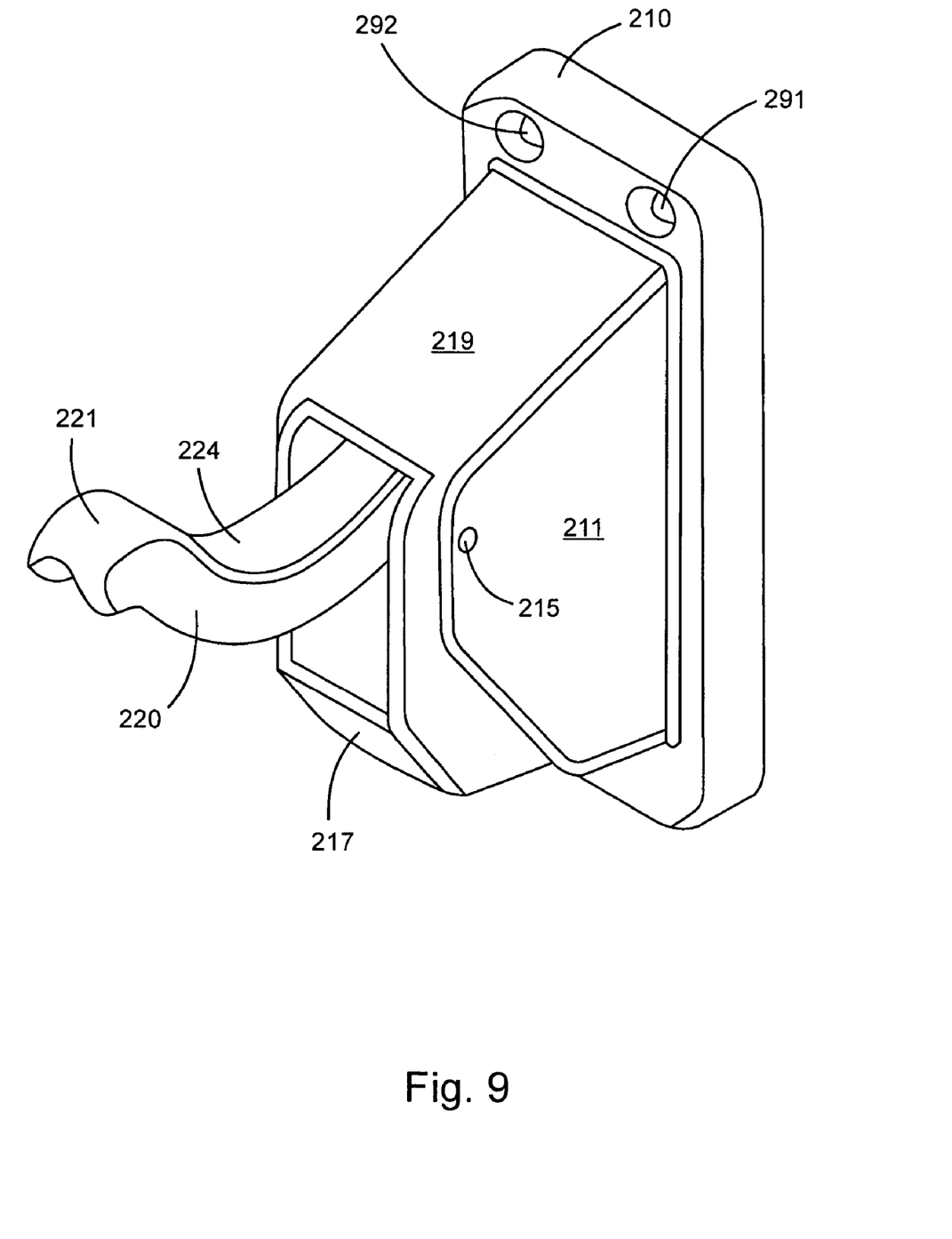
FIG. 9 is a perspective view of a third embodiment of a hook of the present invention.
Figure 10A:
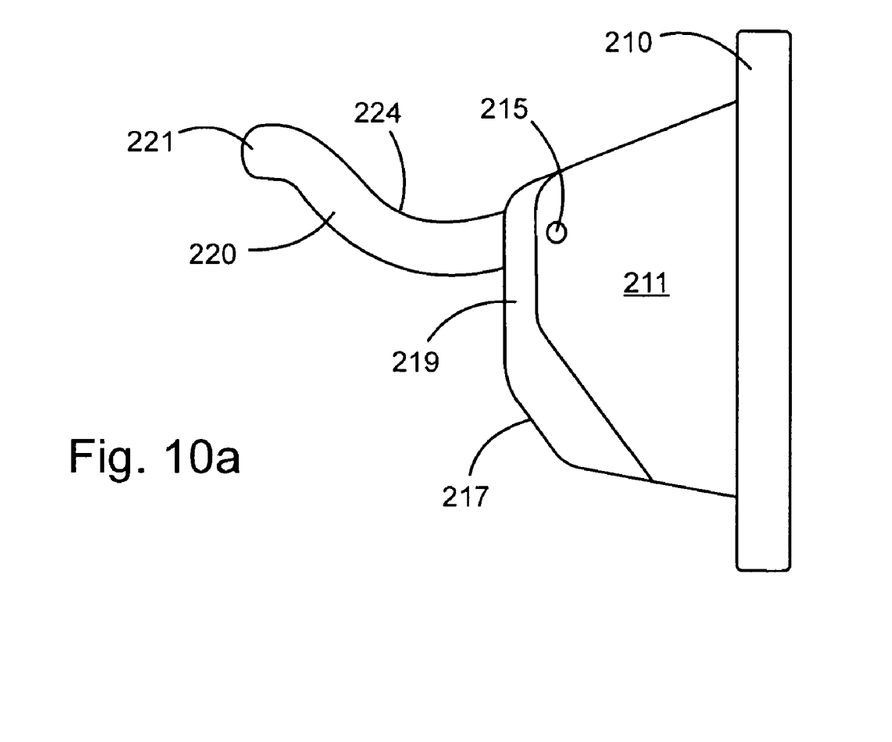
FIGS. 10a and 10b are side views of the hook of FIG. 9 in a load bearing position and a load releasing position, respectively; and,
FIGS. 11a and 11b are side sectional views of the hook of FIG. 9 in a load bearing position and a load releasing position, respectively, taken through the middle of the hook.
Figure 10B:
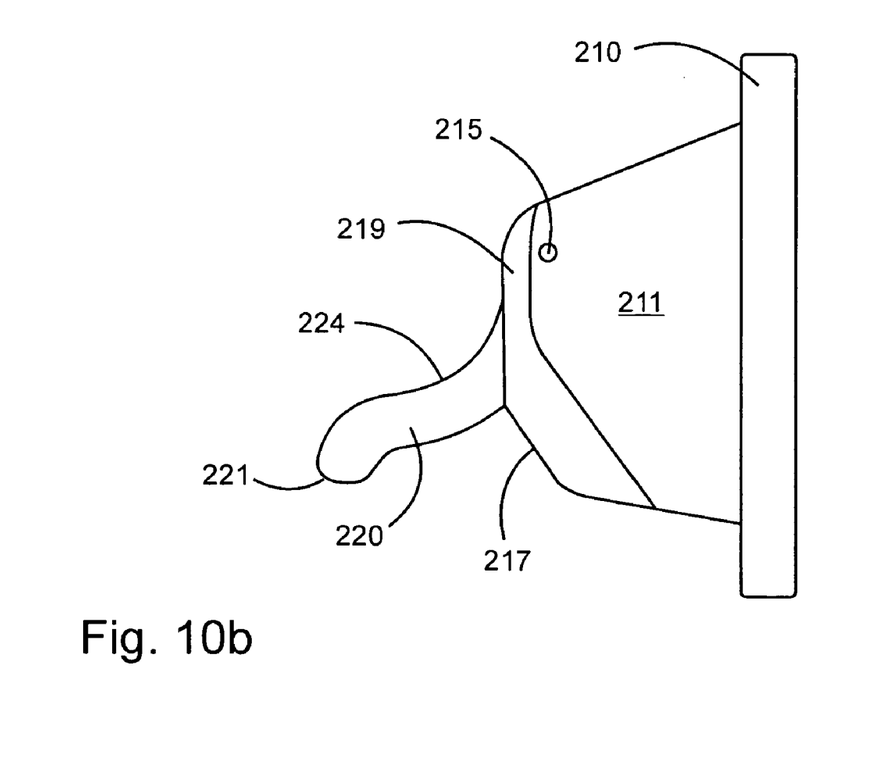
Figure 11A:
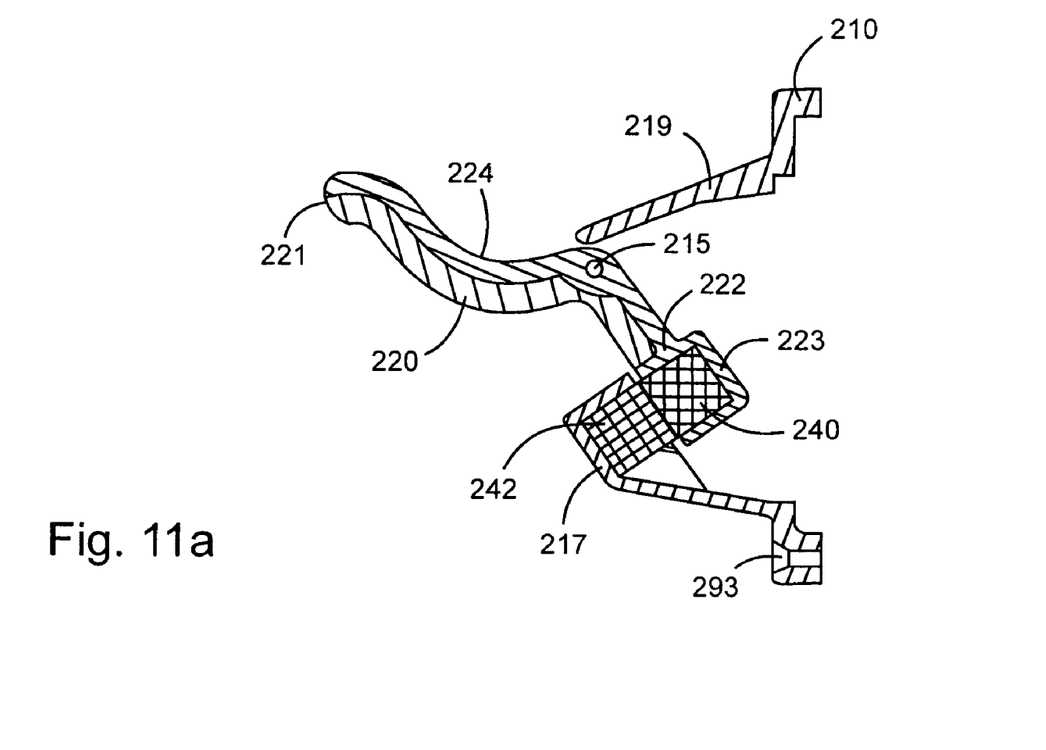
Figure 11B:
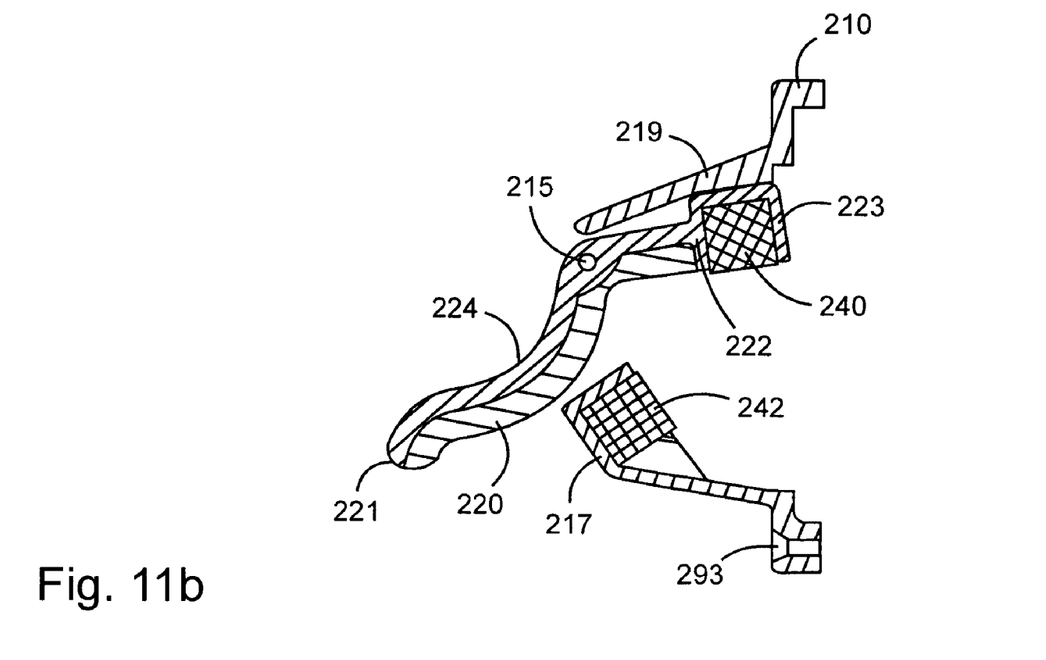

Referring to FIGS. 9–11, a hook in accordance with a third embodiment of the present invention comprises a base 210 having two outwardly extending spaced-apart brackets (only one shown at 211). The base is mountable to an upright surface such as a wall by means of screws through three screw holes 291,292,293 in the base. Safety screws may be used and the screw holes may be countersunk so that the heads of the screws do not protrude above the surface of the base. When the base is mounted on an upright surface, the brackets protrude horizontally. All edges of the base and brackets are contoured for smoothness.

An arm 220, having a first end 221 and a second end 222, is disposed between and pivotally mounted to the brackets by means of a pin 215 inserted through aligned apertures in the brackets and through a hole in the arm. The pin 215 is thus located at a pivot position between the first and second ends of the arm. As is most clearly seen in FIGS. 11a and 11b, the arm can pivot about the pin 215 between a load bearing position (FIG. 11a) and a load releasing position (FIG. 11b). The section of the arm between the first end 221 and the pin 215 is a load bearing section and generally bears a load placed on the hook. The section of the arm between the second end 222 and the pin 215 is an effort bearing section.

The arm 220 is generally U-shaped in the load bearing section forming a groove or valley 224. When an article is placed on the hook it will slide down into the valley providing a load on the load bearing section substantially at the valley. The tops of the brackets are angled down and toward the front of the base so that articles cannot be hung from the base. Instead, articles will slide forward and down into the valley. Still referring to FIG. 11a, when the arm is in the load bearing position, the arm between the valley 224 and the first end 221 generally extends upwardly and outwardly so that a load cannot slip out of the valley and off the hook. However, the length of the arm just before the first end 221 is smooth and rounded to assist in permitting a load to slip off the arm when the arm is in the load releasing position as shown in FIG. 11b. In the load releasing position, the arm 220 generally extends downwardly and outwardly.

The section of the arm 220 from the pin 215 to the second end 222 is the effort bearing section. As is evident from FIGS. 11a and 11b, the effort bearing section angles downwardly from the pin to the second end when the arm is in the load bearing position (FIG. 11a) and angles upwardly from the pin to the second end when the arm is in the load releasing position (FIG. 11b). Integrally formed with the arm 220 at the second end 222 is a pocket 223 for holding a first magnet 240. The first magnet may be frictionally secured in the pocket or it may be secured in the pocket by structural adhesive. The material from which the arm 220 is formed may have the capacity to concentrate, direct and therefore increase the pull force of the first magnet 240 contained in the pocket 223.

Referring to FIG. 11a, when the arm is in the load bearing position, the first magnet 240 rests on and is magnetically connected to a second magnet 242. The second magnet is secured by structural epoxy to a second magnet support 217. When a load having a weight in excess of about 23 pounds is placed on the load bearing section of the arm 220, the first magnet 240 releases from the second magnet 242 and the arm moves to the load releasing position as depicted in FIG. 11b. The second end 222 of the arm together with the first magnet 240 in its pocket 223 moves arcuately as the arm 220 moves to the load releasing position. In the load releasing position, the second end 222 of the arm and the pocket 223 abut the underside of guard housing 219 and the first magnet 240 is separated from the second magnet 242.

When the arm 220 is in the load releasing position, the load slides off the arm. Once the load has been removed from the arm, the weight of the second magnet 240 under the influence of gravity (i.e. the effort) pulling down on the effort bearing section of the arm causes the arm to pivot about the pin 215 thereby returning the arm to the load bearing position. Once the arm is back in the load bearing position, the fist magnet 240 once again rests on the second magnet 242 and magnetically re-connects to the second magnet maintaining the arm in the load bearing position.

Guard housing 219 is an integral part of the base 210 and completely covers the front and top of the hook except for a slot through which the arm 220 protrudes. The guard housing helps prevent access to the inside of the hook from the front thereby reducing the possibility of tampering, even more so than in the previous embodiments described above. The guard housing further increases the aesthetic appeal of the hook. The guard housing 219 is located between the brackets. The second magnet support 217 is an integral part of the guard housing. In fact, the base is formed as one integral unit including the brackets (e.g. 211), guard housing 219 and second magnet support 217. This provides better structural rigidity and better protection against tampering.

In order to insert the arm 220 and the magnets 240,242 into the hook, the back of the base 210 is hollowed out to provide an opening. When mounted to an upright surface, the opening is inaccessible. Therefore, the magnets and other inner workings of the hook are inaccessible when the hook is mounted.

In comparison to previously described embodiments, the third embodiment described herein advantageously provides better protection against tampering, requires fewer parts, is aesthetically more pleasing and can better hold the weight of a typical knapsack as well as a typical garment.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:
1. A hook comprising:
 (a) a base having a back and a front and having two spaced-apart outwardly extending brackets;
 (b) an arm having a first end and a second end, the arm pivotally mounted to and between the brackets at a pivot position between the first and second ends so that the arm has a load bearing section from the first end to the pivot position and an effort bearing section from the second end to the pivot position, the arm pivotable between a load bearing position and a load releasing position;
(c) a first magnet secured to the arm proximal the second end;
(d) a second magnet secured to the base;
(e) the first magnet magnetically connected to the second magnet to maintain the arm in the load bearing position, the magnetic connection releasable to permit the arm to move towards the load releasing position when a load having a weight in excess of a predetermined weight is applied to the load bearing section of the arm; and,
(f) the first magnet providing weight on the effort bearing section of the arm for returning the arm to the load bearing position after the load has been released.

2. The hook of claim 1, wherein the base further comprises a guard housing between the spaced-apart brackets.

3. The hook of claim 1, wherein the first magnet is secured within a pocket integrally formed with the arm at the second end of the arm.

4. The hook of claim 1, wherein the base has an opening in the back.

5. The hook of claim 2, wherein the base is integrally formed including the guard housing and the brackets.

6. The hook of claim 1, wherein the base and the arm are made of a plastic or plastic composite.

7. A hook comprising:
(a) a base having a back and a front, two spaced-apart outwardly extending brackets, and a guard housing between the spaced-apart brackets, the back of the base having an opening;
(b) an arm having a first end and a second end, the arm pivotally mounted to and between the brackets at a pivot position between the first and second ends so that the arm has a load bearing section from the first end to the pivot position and an effort bearing section from the second end to the pivot position, the arm pivotable between a load bearing position and a load releasing position;
(c) a first magnet secured in a pocket integrally formed with the arm at the second end;
(d) a second magnet secured to the base;
(e) the first magnet magnetically connected to the second magnet to maintain the arm in the load bearing position, the magnetic connection releasable to permit the arm to move towards the load releasing position when a load having a weight in excess of a predetermined weight is applied to the load bearing section of the arm; and,
(f) the first magnet providing weight on the effort bearing section of the arm for returning the arm to the load bearing position after the load has been released.

8. The hook of claim 7, wherein base and the arm are made of a plastic or plastic composite.

9. A hook rack comprising a plurality of hooks as defined in claim 1 mounted on a support means.

10. A hook rack comprising a plurality of hooks as defined in claim 2 mounted on a support means.

11. A hook rack comprising a plurality of hooks as defined in claim 3 mounted on a support means.

12. A hook rack comprising a plurality of hooks as defined in claim 4 mounted on a support means.

13. A hook rack comprising a plurality of hooks as defined in claim 5 mounted on a support means.

14. A hook rack comprising a plurality of hooks as defined in claim 6 mounted on a support means.

15. A hook rack comprising a plurality of hooks as defined in claim 7 mounted on a support means.

16. A hook rack comprising a plurality of hooks as defined in claim 8 mounted on a support means.

* * * * *

UNITED STATES PATENT AND TRADEMARK OFFICE
CERTIFICATE OF CORRECTION

| | | |
|---|---|---|
| PATENT NO. | : 7,131,616 B2 | Page 1 of 1 |
| APPLICATION NO. | : 11/055689 | |
| DATED | : November 7, 2006 | |
| INVENTOR(S) | : Livingstone | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (25) days Delete the phrase "by 25" and insert -- by 83 days--

Signed and Sealed this

Fourteenth Day of August, 2007

JON W. DUDAS
*Director of the United States Patent and Trademark Office*